Figure 1:
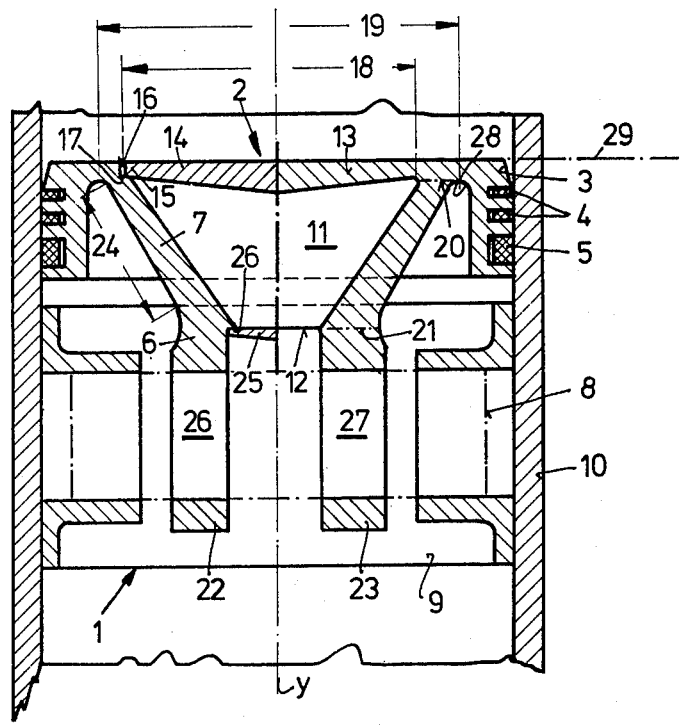

United States Patent [19]

Elsbett et al.

[11] 4,256,022
[45] Mar. 17, 1981

[54] PISTON FOR RECIPROCATING INTERNAL COMBUSTION ENGINES, TYPICALLY DIESEL ENGINES

[76] Inventors: Ludwig Elsbett; Günter Elsbett, both of c/o Industriestrasse 14, 8543 Hilpoltstein, Fed. Rep. of Germany

[21] Appl. No.: 898,151

[22] Filed: Apr. 20, 1978

[51] Int. Cl.³ .............................. F16J 100; F16J 1/16
[52] U.S. Cl. ...................................... 92/190; 92/176; 92/216; 92/219; 92/238; 123/193 P
[58] Field of Search ................. 92/190, 216, 219, 176, 92/238; 123/13 P, 41.16

[56] References Cited

U.S. PATENT DOCUMENTS

| | | | |
|---|---|---|---|
| 1,373,291 | 3/1921 | Betker | 92/176 |
| 1,584,520 | 5/1926 | Duncan | 92/208 |
| 1,678,957 | 7/1928 | Phillip | 92/176 X |
| 3,187,643 | 6/1965 | Pope | 2/208 X |
| 3,485,143 | 12/1969 | Canady | 92/176 |
| 3,516,335 | 6/1970 | Fangman | 92/186 X |
| 3,730,163 | 5/1973 | Elsbett et al. | 123/193 P |
| 3,906,924 | 9/1975 | Elsbett | 123/193 P |
| 4,056,044 | 11/1977 | Kamman et al. | 123/41.35 |
| 4,083,292 | 4/1978 | Goloff | 92/186 X |
| 4,129,108 | 12/1978 | Elsbett et al. | 123/193 P |

FOREIGN PATENT DOCUMENTS

| | | | |
|---|---|---|---|
| 2545588 | 4/1977 | Fed. Rep. of Germany | 123/193 P |
| 2545589 | 4/1977 | Fed. Rep. of Germany | 123/193 P |
| 333878 | 8/1930 | United Kingdom | 123/193 P |

*Primary Examiner*—Cohen, Irwin C.
*Attorney, Agent, or Firm*—Buell, Blenko, Ziesenheim & Beck

[57] ABSTRACT

A piston for reciprocating internal combustion engines, especially Diesel engines, is provided having a crown exposed to the heat of combustion gases, a guide member spaced from said crown, a shell connecting said crown and guide member, a ring carrier connected to the crown of said piston, sealing and oil control rings in said ring carrier, said ring carrier being connected to said crown by a constriction situated adjacent a straight line extending through the crown of the piston, said shell being formed at its end away from the crown with a base formed by two bifurcated legs, said legs being arranged symmetrically to a plane extending through the center of the piston and formed with eyes, a wrist pin in said eyes connecting said shell with said guide member, said shell being in the form of a truncated cone provided in its interior with a cavity constructed at least in one direction of the longitudinal axis of the piston.

10 Claims, 2 Drawing Figures

PISTON FOR RECIPROCATING INTERNAL COMBUSTION ENGINES, TYPICALLY DIESEL ENGINES

This invention relates to a piston for reciprocating internal combustion engines, typically Diesel engines, with a crown exposed to the combustion gas heat and a shell connecting said crown with a guide member transmitting only normal forces and a ring carrier connected to the crown of the piston and provided with sealing and oil control rings, said ring carrier being connected via a constriction situated on or near a straight line extending through the crown of the piston to the latter and in which piston the crown with the shell connecting the crown with said guide member is provided at its end opposite to the crown with a base formed by two bifurcated legs arranged symmetrically to a plane extending through the centre of the piston and having eyes for a wrist pin connecting the shell to the guide member.

In high-speed reciprocating internal combustion engines, typically Diesel and Otto cycle engines, the trend is towards to keeping the moving masses as low as possible in order to permit higher outputs by increasing the speed of the internal combustion engines. One possibility of reducing the moving masses is in the design of the piston and its actuating parts and various efforts are being made to construct these parts in a manner to save weight.

In order to meet these requirements, it has been the subject of an earlier disclosure to divide a piston of this type in two sections one of which is exposed to the heat of the combustion gases while the other section serves to guide the former section. The individual sections in this earlier disclosure are articulated with eachother by a wrist pin, the first section which serves to seal the piston against the wall of a cylinder being relieved from the transmission of normal forces due to the motion of the piston in the cylinder. The other section serving for guidance, the socalled guiding member, in this disclosure is constructed as a shell supported on the walls, the normal forces due to the motion of the piston in the cylinder being transmitted into said shell which is relieved from the effects of the gas pressure. The former section of the piston exposed to the heat of the combustion gases, in this instance the piston crown, is provided with a ring carrier to which are attached sealing and oil control rings of the piston and this piston is formed with a recess facing the crown. The base of the piston is connected with the wrist pin through a form-locking connecting member arranged on the perpendicular longitudinal axis of the piston in a manner that said wrist pin by pivotting in its bearings will permit the oscillating motions of the crown. Investigations have shown, however, that this kind of concept will save considerable material and consequently, moving masses, but that the connection of the individual sections of the piston through this form locking connection alone is liable to cause some difficulties, especially if the connection of the individual sections was made without the necessary care (see German Pat. No. 1 576 013).

The present invention has for its object to improve a piston of this type in a manner that while keeping the weight low it will have a high stability and, in addition, by simply varying its components, will permit matching to various combustion processes such as processes taking place in the piston interior or outside the piston.

According to the present invention, this object is achieved in a piston of the type initially referred to in that the shell is formed in the shape of a truncated cone and provided in its interior with a recess which recess is closed at least in one direction of the longitudinal axis (axis of rotation) of the piston. These features of the invention will not only advantageously solve the problem on which the invention is based but provide a piston which is distinguished by a straight-forward method of production. This new piston cannot only be manufactured on automatic machine-tools, but it is also possible to cast it and to finish only the parts facing the cylinder wall to improve running properties in the cylinder by machining. Where the piston is produced by casting, machining can be reduced to a very great extent so that this member produced in mass production for internal combustion engines of this type will afford not only very low costs and reliable manufacture but also enable it to be constructed with a very high stability.

Further advantageous developments of the invention may be derived in particular from the remaining subclaims.

Figure 2:
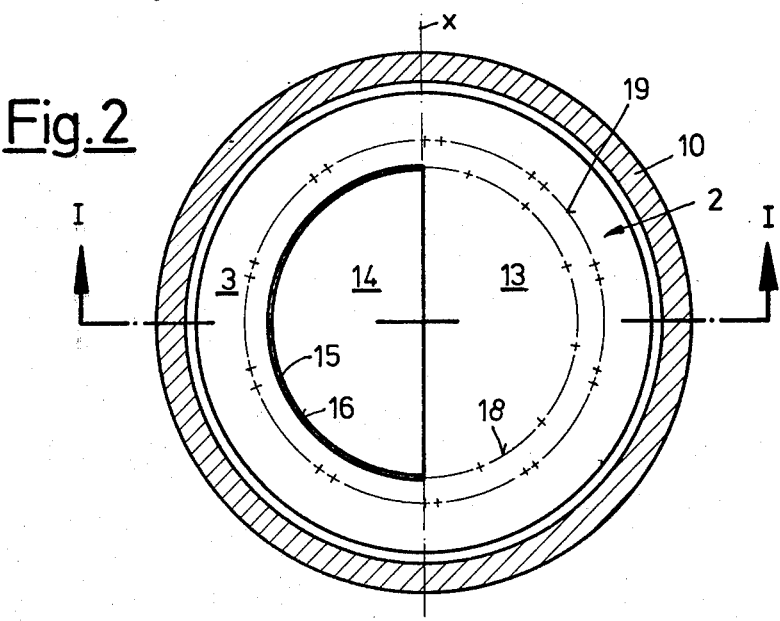

A typical embodiment of the invention is shown schematically in the drawing in which:

FIG. 1 is a longitudinal centre section through a piston in the plane I—I in FIG. 2 and FIG. 2 is a plan view of a complete piston, but with one half with a cavity open at one end in the direction of the longitudinal axis and closed at both ends.

The piston 1 according to the invention is essentially formed by two sections of which one is exposed to part of the heat due to the combustion gases while the other section behind this first-mentioned section assumes guiding functions for the first section. The section exposed to the heat of the combustion gases is formed by a crown 2 and, adjoining this, a ring carrier 3 to which are fitted the sealing and oil control rings 4, 5 and a shell 7 connecting said crown with a base 6 of the piston 1, said section being connected via its base and via a wrist pin 8 connecting the base with the other section and shown only by dash-dot lines to said second section. The second section is formed as a guiding member 9 which in this case is ring-shaped and radially supported with its shell on the inner walls of a cylinder 10. Guiding member 9 serves to transmit normal forces due to the skewed position of the connecting rod as its moves longitudinally in a cylinder 10 and is connected to that first section in an oscillating manner so that said first section being relieved from normal forces may exclusively perform the functions of sealing the ring carrier 3 and consequently the crown 2 of the piston 1 against the cylinder 10. The shell 7 which connects the crown 2 of the piston 1 with its base 6 is in this embodiment in the shape of a truncated cone and provided with a cavity 11 in its interior which according to the right-hand representation of the piston 1 in FIG. 1 communicates with an opening 12 with the outside near the base 6. The crown 2 of the piston 1 in the right-hand representation of the said piston in FIG. 1 is constructed as a closed crown part 3 extending across the full diameter of the crown whereas in the left-hand representation in FIG. 1 it is capable of being closed by means of a cover 14. In an embodiment of the piston 1 with such a cover 14 to close the cavity 11 in the interior of the shell 7 it is desirable to connect the rim 15 of the cover, for example, by friction or electron-beam-welding to the crown 2 of the piston in an inseparable manner in order to form the piston in this fashion as an integral unit. In the left-hand representation of the piston 1 in FIG. 1 a gap 16 is shown for better reference between the rim 15 of the cover 14 and the crown 2 which gap would be filled with welding metal. For fitting the cover 14, a seat 17 is formed in the crown 2 near its rim 15. In order to impart to the crown 2 of piston 1 a stability as required to transmit the gas pressure it is advantageous to construct the crown, irrespective of whether it is formed as a continuous crown part 13 or a cover 14, with a cross-sectional area as shown in FIG. 1 which increases towards the axis of rotation y from the rim or from the outside towards the inside, with the maximum cross-section being situated about the axis of rotation.

Analogously to the cone shape of the shell 7, the cavity 11 in the interior is also constructed with a cone shape. The base of this cavity 11 which faces the crown 2 of the piston 1 may have a diameter 18 which may substantially have the size of a centroid circle 19 of the crown, the centroid circle being defined here as having approximately 0.7 times the diameter of the crown of the piston.

The shell 7 connecting the crown 2 with the base 6 of the piston 1 may as shown have the preferred shape of a cone and, near its ends i.e. on its basis 20 and its truncated cone 21, may be connected via supporting faces both on the crown 2 and the legs 22, 23 near the base 6 of the piston. The areas of the part sections of the shell 7 should preferably be equal in all cross-sectional planes along its length 24 which is achieved by constructing the shell as a rotating-symmetrical part and matching the cavity 11 itself to this rotation-symmetric shape.

In special cases, it is conceivable that the cavity 11 is closed both at the crown 2 and at the base 6 by means of another cover 25 and that this cavity itself is left in such a case as a hollow space. Closing of this cavity 11 may be effected by means of the above-mentioned cover 25 or, if an opening exists in the crown 2, by leaving a wall section near the base 6. Where a cover 25 is provided also at the base 6 of the piston 1, it is necessary to also provide the shell 7 at its end facing the base, i.e. near the truncated cone 21, also with a seat 26. The connection of this cover 25 with the shell 7 may, same as the connection of the cover 14 to crown 2, be by electron-beam welding or a similar process.

As a rule, and this has been shown by existing applications of the piston 1, this piston would be formed with a crown 2 in the shape of a continuous wall part 13, leaving the cavity 11 at the base of the piston open. In this type of configuration of piston 1 it is also possible by introducing an oil spray into its cavity 11 to cool it if this appears necessary in view of the stressing of the piston.

The legs 22, 23 provided at the base 6 of the piston 1 may in such a case have sufficiently wide gaps between them at the level of their eyes 26, 27 for the wrist pin 8, in addition to being symmetrically disposed about a longitudinal centre plane X extending through the piston through which gaps the oil spray may reach into the cavity 11. In the case of a close form of the cavity 11 at the base 6 of the piston 1 it is conceivable to provide adequate cooling of the area around the base by means of said oil sprays.

Tests on such heat-sealed pistons 1 have also shown that by connecting the ring carrier 3 through a constriction 28 on the crown 2 the sealing and oil control rings 4, 5 provided on the ring carrier will be effectively protected from the effects of heat so that these rings not only will have a longer life expectancy but can be made from less heat-resistant material and consequently at lower cost. The constriction 28 between the crown 2 and the ring carrier 3 of the piston 1 is at a level of a straight line 29 extending at the crown of the piston.

Thus, the piston 1 cannot only be provided with the cavity 11 inside its shell 7, but this cavity may, depending on the selection of the combustion system on the one hand and weight-saving construction of the piston on the other hand, be closed at least in one direction of the longitudinal axis, i.e. the axis of rotation Y of the piston. In this manner, the piston 1 can be very conveniently be matched to existing conditions so that in many cases a basic concept of the piston may have to be manufactured and kept in stock for various combustion systems (combustion chamber in the piston interior or outside).

In the foregoing specification we have set out certain presently preferred practices and embodiments of this invention, however, it will be understood that this invention may be otherwise practiced within the scope of the following claims.

We claim:

1. In a piston for reciprocating internal combustion engines, typically Diesel engines, with a crown exposed to the heat of the combustion gases and a shell connecting said crown with a guide member which transmits only normal forces and a ring carrier connected to the crown of the piston and provided with sealing and oil control rings which ring carrier is connected by a heat transmission restricting constriction situated near a straight line extending through the crown of the piston to the latter and in which piston the shell connecting the crown with said guide member is formed integrally with the ring carrier and at least a portion of the crown containing said constriction at its end facing away from the crown with a base is formed by two bifurcated legs, said legs being arranged symmetrically to a plane extending through the center of the piston and formed with eyes for a wrist pin connecting said shell with said guide member and a wrist pin passing through said eyes and journalled in said guide member, the improvement comprising said shell being in the shape of a hollow truncated cone integral with the ring carrier and provided in its interior beneath the crown with a cavity said cavity being constructed at least in one direction of the longitudinal axis (axis of rotation Y) of the piston, and means closing the end of said cone at the crown said crown being exposed to the heat of combustion gases, and said cone and said closing means increasing in wall thickness from the constriction to the longitudinal axis of the piston.

2. A piston as in claim 1, characterized in that the crown of the piston near the axis of rotation (Y) of the cavity is formed with a wall thickness increasing conically towards the centre of the cavity.

3. A piston as in claim 2, characterized in that the conically increasing wall thickness extends from the rim of the cavity at its base to the axis of rotation (Y).

4. A piston as in claim 1, characterized in that the annular areas of all cross sections of the wall of the shell are equal in any given cross sectional plane transverse to the axis of rotation Y.

5. A piston as in claim 1, characterized by an opening in the crown of the piston communicating with the cavity inside the shell of the piston in addition to an opening facing the base and by a cover closing the crown opening and connected to the crown which cover also forms part of the crown.

6. A piston as in claim 5, characterized in that the cover is connected to the crown near the centroid circle of said crown.

7. A piston as in claim 1, characterized by an opening of the cavity facing the base and a cover closing said opening.

8. A piston as in claim 6, characterized in that the cover is inseparably connected to the crown of the piston.

9. A piston as in claim 6, characterized in that the cover is separably connected to the crown of the piston.

10. A piston for reciprocating internal combustion engines, such as Diesel engines, comprising a crown exposed to the heat of combustion gases, a guide member spaced from said crown, a shell connecting said crown and guide member, a ring carrier connected to the crown of said piston, sealing and oil control rings in said ring carrier, said ring carrier being connected to said crown by a heat transmission restricting constriction situated adjacent a straight line extending through the crown of the piston, said shell being integral with said ring carrier and at least a portion of the crown containing the constriction and being formed at its end away from the crown with a base formed by two bifurcated legs, said legs being arranged symmetrically to a plane extending through the center of the piston and formed with eyes, a wrist pin in said eyes connecting said shell with said guide member, said shell being in the form of a hollow truncated cone integral with the ring carrier provided in its interior with a cavity constructed at least in one direction of the longitudinal axis of the piston, means closing lock end of said cone at the crown and base, said cone increasing generally uniformly in wall thickness from said crown to said bifurcated legs and said closing means for each end increasing in wall thickness towards the longitudinal axis of the piston.

* * * * *

UNITED STATES PATENT AND TRADEMARK OFFICE
CERTIFICATE OF CORRECTION

PATENT NO. : 4,256,022

DATED : March 17, 1981

INVENTOR(S) : LUDWIG ELSBETT and GUNTER ELSBETT

It is certified that error appears in the above-identified patent and that said Letters Patent are hereby corrected as shown below:

On the Title Page, under "References Cited", the class of the Pope reference should be --92/208 X--.

Signed and Sealed this

Fourth Day of August 1981

[SEAL]

Attest:

Attesting Officer

GERALD J. MOSSINGHOFF

Commissioner of Patents and Trademarks